(12) United States Patent
Davis et al.

(10) Patent No.: US 11,485,081 B2
(45) Date of Patent: Nov. 1, 2022

(54) THREE-DIMENSIONAL PRINTHEAD INCLUDING TWO-DIMENSIONAL SCANNING SYSTEM WITH ENCLOSED PRINTHEAD

(71) Applicant: BRILL, INC., Tucker, GA (US)

(72) Inventors: Corey M. Davis, Wilsonville, OR (US); Michael E. Jones, West Linn, OR (US)

(73) Assignee: CULINARY PRINTWORKS, INC., Ojai, CA (US)

( * ) Notice: Subject to any disclaimer, the term of this patent is extended or adjusted under 35 U.S.C. 154(b) by 0 days.

(21) Appl. No.: 16/908,382

(22) Filed: Jun. 22, 2020

(65) Prior Publication Data

US 2020/0398488 A1 Dec. 24, 2020

Related U.S. Application Data

(60) Provisional application No. 62/864,577, filed on Jun. 21, 2019.

(51) Int. Cl.
| | | |
|---|---|---|
| *B29C 64/25* | (2017.01) | |
| *B29C 64/245* | (2017.01) | |
| *B29C 64/209* | (2017.01) | |
| *B29C 64/386* | (2017.01) | |
| *B29C 64/236* | (2017.01) | |
| *B29C 64/35* | (2017.01) | |
| *B33Y 30/00* | (2015.01) | |
| *B29C 64/165* | (2017.01) | |

(52) U.S. Cl.
CPC ............ *B29C 64/25* (2017.08); *B29C 64/209* (2017.08); *B29C 64/236* (2017.08); *B29C 64/245* (2017.08); *B29C 64/386* (2017.08); *B29C 64/165* (2017.08); *B29C 64/35* (2017.08); *B33Y 30/00* (2014.12)

(58) Field of Classification Search
CPC ..................................... B29C 64/25
See application file for complete search history.

(56) References Cited

U.S. PATENT DOCUMENTS

| | | | | |
|---|---|---|---|---|
| 8,632,160 | B2 * | 1/2014 | Ogawa | ...... B41J 25/34 |
| | | | | 347/37 |
| 2020/0298476 | A1 * | 9/2020 | Saito | ...... C09D 11/30 |

* cited by examiner

*Primary Examiner* — Alison L Hindenlang
*Assistant Examiner* — Virak Nguon
(74) *Attorney, Agent, or Firm* — Bryan Cave Leighton Paisner LLP

(57) ABSTRACT

A three-dimensional printing system includes a build plate, a carriage, a housing assembly covering the carriage, and a printhead. The build plate includes a lateral print area having a length along an X-axis and a width along a Y-axis. The carriage has a major axis along the Y-axis that spans the width of the lateral print area. The printhead is mechanically, fluidically, and electrically coupled to the carriage. The printhead includes a printhead housing that cooperates with the housing assembly to separate a print zone containing the lateral print area from connected internal components of the printhead and the carriage. The carriage is configured to scan along the X-axis and the printhead is configured to scan along the Y-axis supported by the carriage to address the entire lateral print area.

20 Claims, 7 Drawing Sheets

THREE-DIMENSIONAL PRINTHEAD INCLUDING TWO-DIMENSIONAL SCANNING SYSTEM WITH ENCLOSED PRINTHEAD

CROSS REFERENCE TO RELATED APPLICATIONS

This non-provisional patent application claims priority to U.S. Provisional Application Ser. No. 62/864,577, Entitled "Three-Dimensional Printhead Including Two-Dimensional Scanning System with Enclosed Printhead" by Corey M. Davis et al., filed on Jun. 21, 2019, incorporated herein by reference under the benefit of U.S.C. 119(e).

FIELD OF THE INVENTION

The present disclosure relates to a layer-by-layer fabrication of a three-dimensional article by a process that includes a use of a printhead. More particularly, the present disclosure concerns a two-dimensional scanning system and an associated housing to prevent contamination of internal components.

BACKGROUND

Three-dimensional printing systems are in wide use for fabricating three-dimensional articles with metals, plastics, ceramics, composites, and other materials. One major type of three-dimensional printing system utilizes a deposition printhead that scans over an area while selectively depositing layers of material. For some embodiments, the deposited material can be a binding agent for providing a matrix around layers of powder. For some applications the material can be subject to bacterial growth. This is particularly true for biomaterial and food products. Contamination of internal parts can result in bacterial growth. There is a need to develop systems that allow for cleaning of external components while protecting internal components.

SUMMARY

Figure 1:
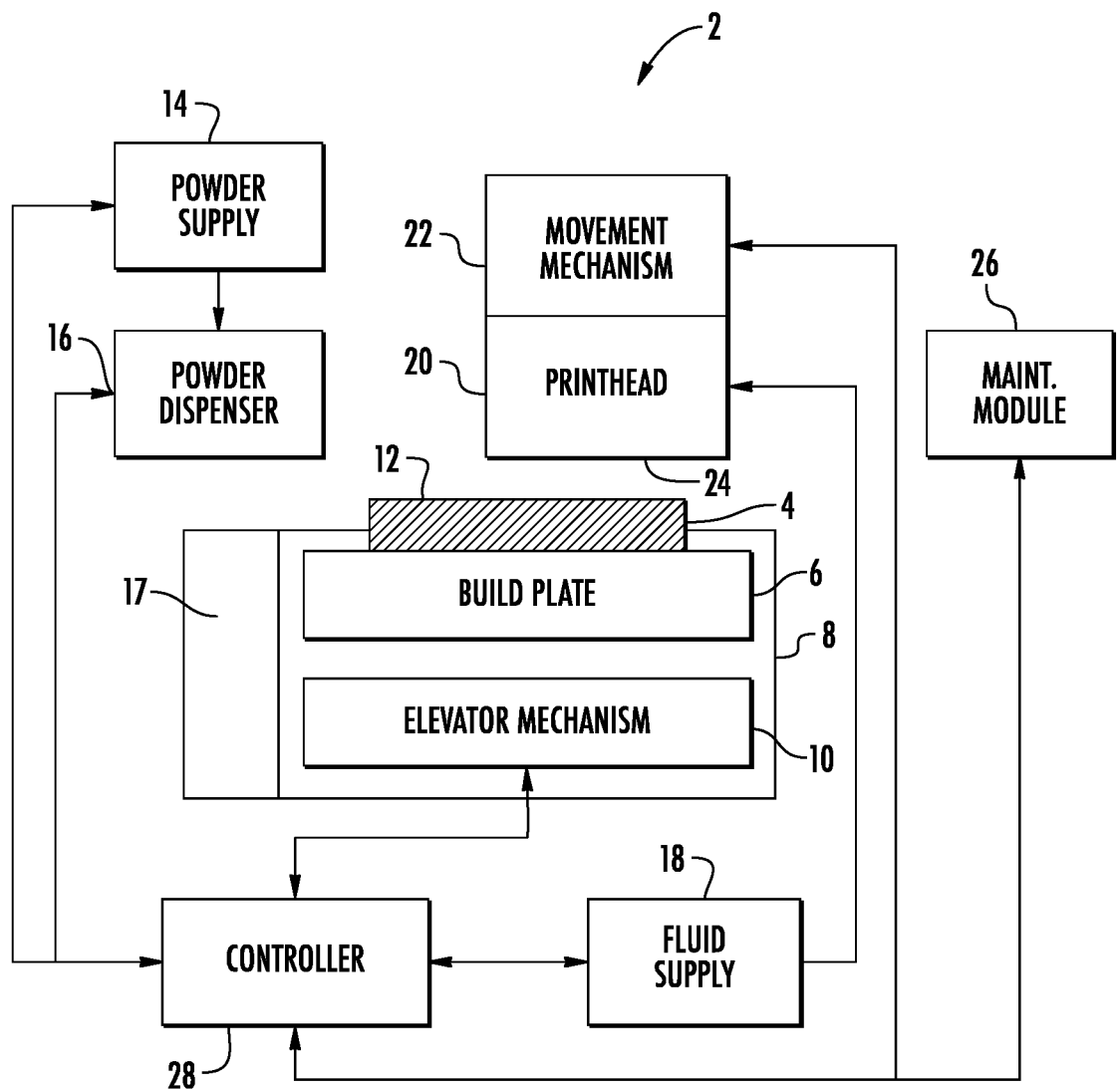
FIG. 1 is a block diagram schematic of an embodiment of a three-dimensional printing system.

In a first aspect of the disclosure, a three-dimensional printing system includes a build plate, a carriage, a housing assembly covering the carriage, and a printhead. The build plate includes a lateral print area having a length along an X-axis and a width along a Y-axis. The carriage has a major axis along the Y-axis that spans the width of the lateral print area. The printhead is mechanically, fluidically, and electrically coupled to the carriage. The printhead includes a printhead housing that cooperates with the housing assembly to separate a print zone containing the lateral print area from connected internal components of the printhead and the carriage. The carriage is configured to scan along the X-axis and the printhead is configured to scan along the Y-axis supported by the carriage to address the entire lateral print area.

The three-dimensional printing assembly is particularly suited to dispensing powder and printing binder. The binder can be an adhesive, a bioactive material, a food material, or another substance that binds together and/or provides a matrix for powder particles. In some cases, bacterial growth in the binder is a concern. The cooperation of the housing assembly and the printhead housing facilitates cleaning of the lateral print area to remove coatings of binder without damage to the connected internal components of the printhead and the carriage.

In one implementation the printhead includes a main body with a lower ejection face that is in facing relation with the lateral print area and a lateral extension that extends along the X-axis from the main body to the carriage. The lateral extension coupling to the carriage defines a connection between internal components of the printhead and internal components of the carriage. The lateral extension can be an upper lateral extension that extends laterally from a top portion of the printhead to the carriage. The housing assembly can include a vertical portion that defines a window; the lateral extension of the printhead can extend into the window. The window can be defined by a gate which scans along the vertical portion of the housing assembly. The housing assembly can include a flexible band having two ends that are individually attached to ends of the gate. A reciprocal motion of the flexible band can provide scanning of the gate and the printhead across the width of the lateral print area.

The combination of the flexible band, the gate, and the lateral extension of the printhead cooperate to seal internal components of the printhead and the carriage that are connected together. This combination also allows the seal to be maintained as the printhead scans along the lateral Y-axis.

In another implementation, the housing assembly includes: an inner housing defining an elongate opening that extends along the Y-axis, a gate that defines a window, and a flexible band that extends around the inner housing and couples to opposing ends of the gate. The band and gate cooperate to close the elongate opening except for the window. The printhead includes a lateral extension that passes into the window. The coupling of the printhead to the carriage is through the window. The housing assembly can include an outer housing that fits over the inner housing and protects the flexible band. The outer housing also has an outer elongate opening that generally overlays the elongate opening of the housing.

In yet another implementation, the housing assembly includes a lower housing assembly and an upper housing assembly. The lower housing assembly includes and supports a lower track. The upper housing assembly is mounted over the lower track and includes an inner housing, an outer housing, a flexible band, a gate, and an upper track. The inner housing defines an inner elongate opening that extends along the Y-axis. The gate defines a window that scans along the inner elongate opening. The flexible band is attached at two ends to the gate. The flexible band encompasses three sides of the inner housing and, in cooperation with the gate, closes the inner elongate opening except for the window. An lower edge of the flexible band is at least partially guided by the lower track. An upper edge of the flexible band is at least partially guided by the upper track. The upper track can be defined by the cooperation of an upper inner track and an upper outer track that are supported by the inner housing. The outer housing fits over the inner housing and the upper track. The outer housing protects the flexible band on three sides and defines an outer elongate opening that generally overlays the inner elongate opening.

DETAILED DESCRIPTION OF THE PREFERRED EMBODIMENTS

FIG. 1 is a block diagram schematic of a three-dimensional printing system 2 for printing a three-dimensional article 4. A build plate 6 is for supporting the three-dimensional article 4 within a build volume container 8. An elevator mechanism 10 is configured to controllably adjust a vertical position of the build plate 6 and also an upper surface 12 of either the build plate 6 or article 4 for dispensing and forming layers onto the article 4.

A supply of powder 14 is configured to provide powder to a powder dispenser 16. The powder dispenser 16 is configured to controllably dispense layers of the powder onto the upper surface 12. The build volume container 8 includes an overflow chamber 17 for receiving excess powder during a powder dispensing operation.

A fluid supply 18 is configured to supply a printing fluid (e.g., a binding agent) to a printhead 20. The printhead 20 is a drop-on-demand fluid-jetting printhead 20. In an illustrative embodiment, the fluid jetting printhead 20 is a piezoelectric printhead with a plurality of drop ejectors or nozzles. A movement mechanism 22 is configured to impart a lateral motion along two axes between the printhead 20 and the build upper surface 12 (otherwise referred to as a lateral print area 12 or build plane 12).

In an illustrative embodiment, the printhead includes an ejection face 24 having a plurality of nozzles. The fluid supply 18 provides a plurality of different printing fluids that are ejected by different nozzles. The printing fluids differ from one another in terms of chemical composition. They may be different from one another in terms of one or more of the chemistry and/or concentration of chemical components. In the illustrative embodiment, they differ in terms of colorant. In an illustrative embodiment, there are four different printing fluids with four different colorants including black, cyan, yellow, and magenta. In other embodiments, there can be more or less different colorants which can also include one or more of red, orange, green, blue, violet, white, and other primary colors. Also, the different printing fluids can vary in terms of colorant concentration such as full concentration cyan versus light cyan and magenta versus light magenta. In yet other embodiments, the colorants can include spot colors which have precisely controlled color coordinates for identity purposes. One use of spot colors is product branding which typically require exact color matches required by the trade dress of products. A maintenance module 26 is for maintaining the printhead 20.

A controller is 28 is electrically or wirelessly coupled to various portions of the system 2 including the elevator mechanism 10, the powder supply 14, the powder dispenser 16, the fluid supply 18, the printhead 20, the movement mechanism 22, the maintenance module 26 and other portions of system 2. The controller 28 includes a processor coupled to an information storage device. The information storage device includes a non-transient or non-volatile computer-readable storage medium storing software instructions or computer-readable code portions. When executed, the software instructions control the portions of the system 2 listed supra. The controller 28 can be a single computer integrated into system 2 or it can include more than one coupled computer including a host computer.

The controller 28 is configured to operate portions of the printing system 2 to manufacture the three-dimensional article 4 and to perform maintenance on the printhead 20. In an illustrative embodiment, printing-based manufacture includes the following steps: (1) operate the elevator mechanism 10 to vertically position the upper surface 12 for receiving a layer of powder; (2) operate the powder dispenser 16 to dispense a layer of powder onto the surface 12; (3A) operate the movement mechanism 22 to scan the printhead 20 over the powder layer and (3B) while scanning the printhead, operate the printhead 20 to selectively dispense printing fluids (binding agent) upon the dispensed powder layer; (4) repeat steps (1)-(3) to complete fabrication of the three-dimensional article 4.

Before, during, or after printing, the controller 28 can also control the fluid supply 18, the printhead 20, the movement mechanism 22, and the maintenance module 26 to maintain reliability of the printhead 20. The controller 28 can also operate these components to maintain the printhead 20 during idle (non-printing) periods of time.

Figure 2:
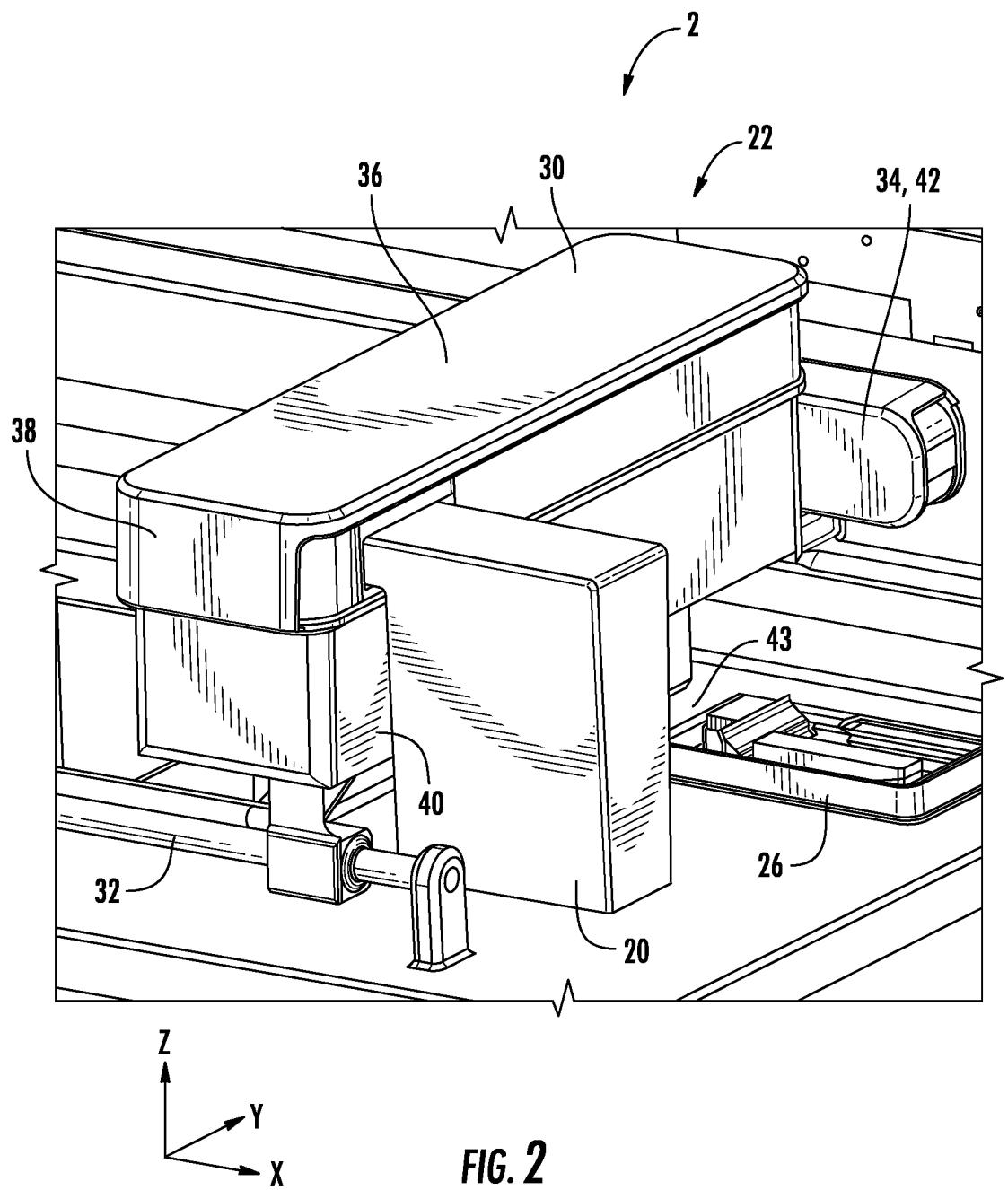
FIG. 2 is an isometric drawing of a portion of an embodiment of a three-dimensional printing system.

FIG. 2 is an isometric drawing of a portion of the three-dimensional printing system 2. In describing system 2, mutually perpendicular axes X, Y, and Z will be used. Axes X and Y are lateral axes that are generally horizontal. Axis Z is generally vertical. By "generally" it is by design and to within manufacturing tolerances.

In the figure, printhead 20 is moved along X and Y by the movement mechanism 22. Movement mechanism 22 includes a carriage 30 that is moved along a slider rod 32 by a belt mechanism 34. The slider rod 32 extends along the lateral X-axis. The printhead 20 is coupled to the main carriage 30 and configured to move along the carriage 30 along the Y-axis. The motion of printhead 20 with the carriage along X and along the carriage along Y allows the printhead access to powder layers for printing and to the maintenance module 26.

A housing assembly 36 covers the carriage 30 and protects internal components from printing fluid contamination. Housing assembly 36 includes an upper housing assembly 38 and a lower housing assembly 40. The printhead 20 is slidingly coupled to carriage 30 through the upper housing assembly 38. Other housings protect other portions of system 2 including a housing 42 that protects the belt mechanism 34.

The lateral area that the printhead 20 can address or print upon can be referred to as a lateral print area 12. A zone or region 43 of the printer that is outside of the housings such as housing assembly 36 that contains the lateral print area 12 and the maintenance module 26 is referred to as a "print zone" 43. Print zone 43 is generally the region that can be contaminated or effected by printing fluid during servicing or printing.

Figure 3:
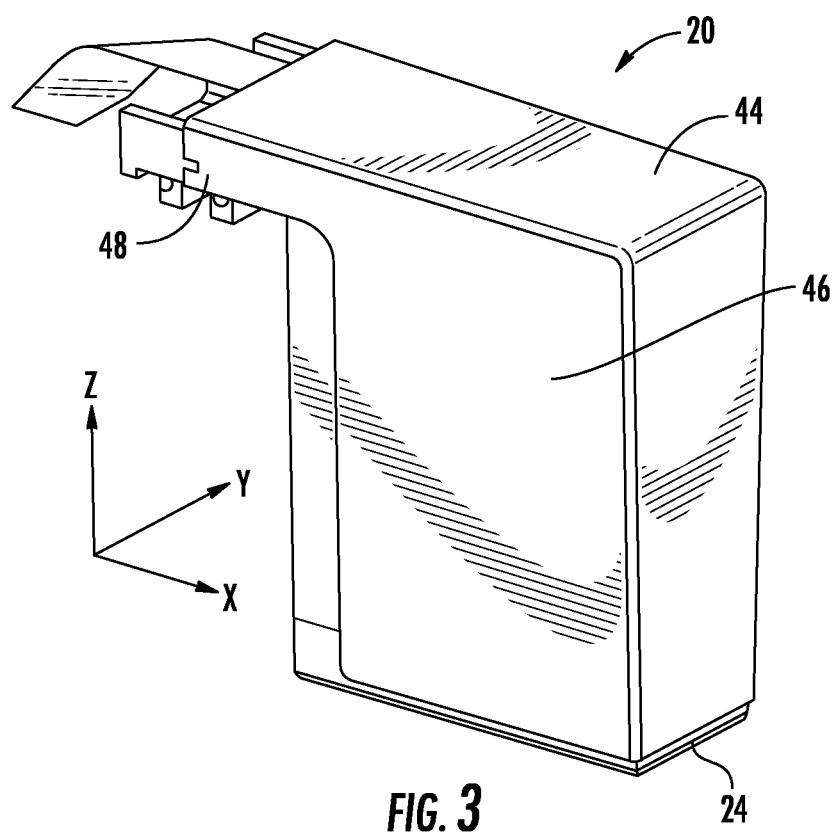
FIG. 3 is an isometric drawing of an embodiment of a printhead which is protected by a printhead housing.

FIG. 3 is an isometric drawing of printhead 20 which is protected by a printhead housing 44. Printhead 20 includes a main body 46, lower ejection face 24, and an upper lateral extension 48. When installed in system 2, the lower ejection face 24 is in facing relation with the lateral print area 12 or more generally in facing relation with the print zone 43. The upper lateral extension 48 extends along the X-axis and mechanically, fluidically, and electrically couples the printhead 20 to the carriage 30.

Figure 4:
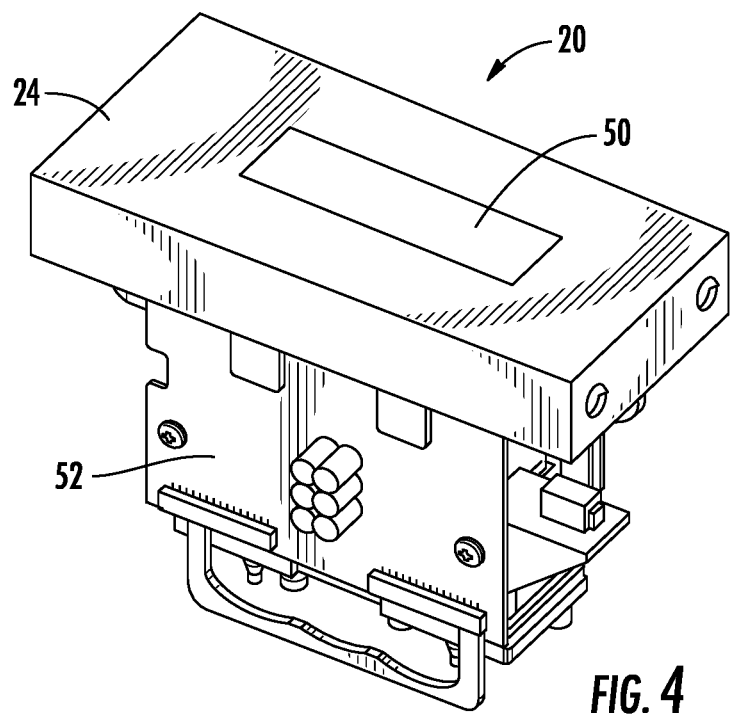
FIG. 4 is an isometric drawing of a portion of an embodiment of a printhead without a printhead housing.

FIG. 4 is an isometric drawing of a portion of printhead 20 without the housing 44. In FIG. 4, the printhead 20 is vertically inverted with the ejection face 24 facing upward. Within ejection face 24 is an array of nozzles 50 or drop generators 50. In an illustrative embodiment, the array of nozzles 50 has a plurality of groups of nozzles (detail not shown) that individually eject different printing fluids. Also shown in FIG. 4 are sensitive internal components 52 including electronics that are normally covered by the housing 44. Generally speaking, the printhead housing 44 and the housing assembly 36 interface with one another to provide a separation between internal portions of the printhead 20 and carriage 30 and the print zone 43. Thus, the internal portions of the printhead 20 and carriage 30 are protected from printing fluid and contamination.

Figure 5:
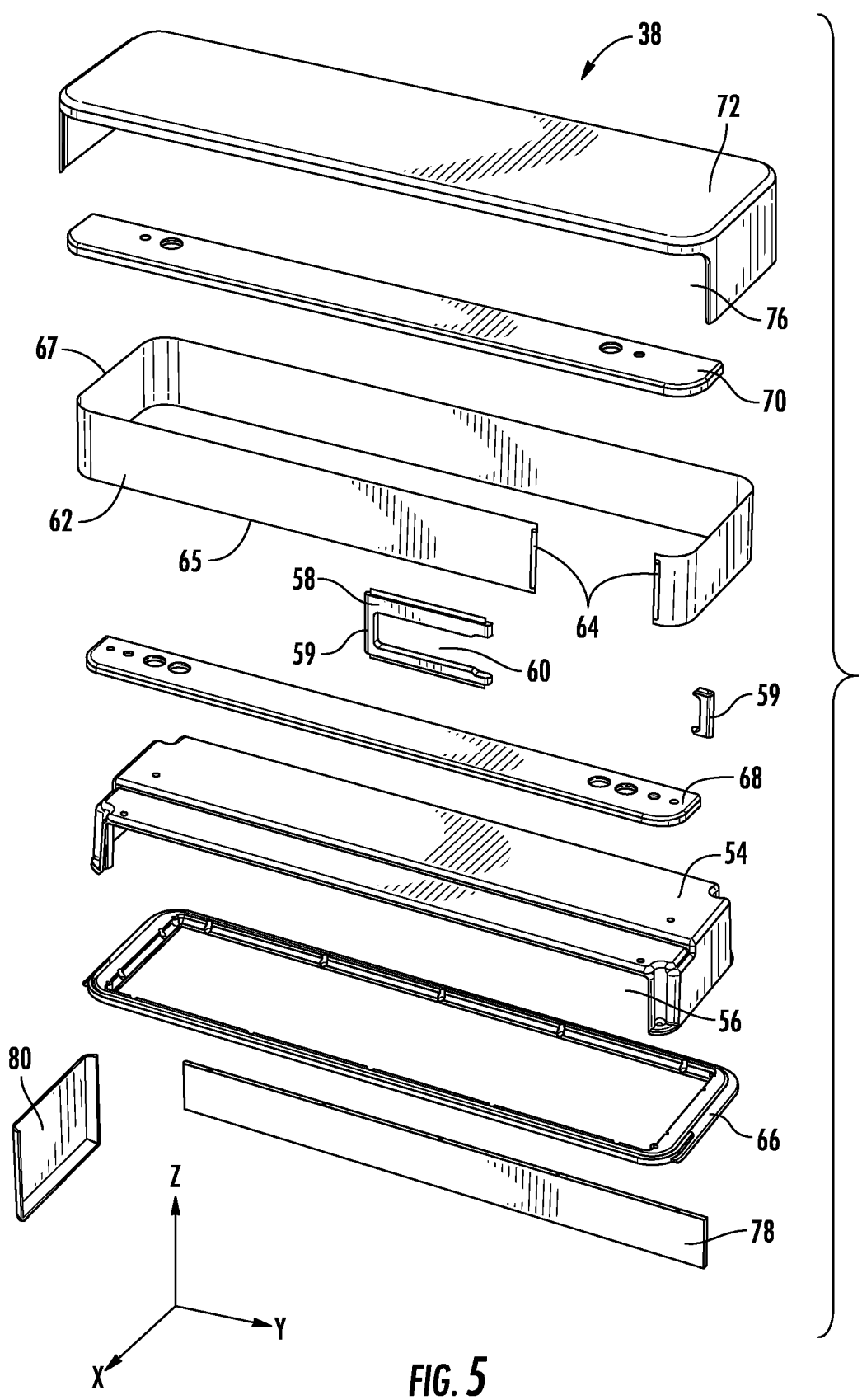
FIG. 5 is an exploded drawing of an embodiment of an upper housing assembly and two elements of a lower housing assembly.

FIG. 5 is an exploded view of the upper housing assembly 38 and two elements of the lower housing assembly 40. This description will start with the upper housing assembly 38 which includes elements 54-76. The lower housing assembly 40 includes elements 78 and 80.

An inner housing 54 defines an elongate opening 56 that extends along the Y-axis. A gate 58 has two vertical ends 59 with respect to the Y-axis. One of the vertical ends 59 provides a gate closure. When closed, the gate 58 defines a window 60. A flexible band 62 has two attachment ends 64 which individually attach to a vertical end 59 of the gate 58. When assembled, the flexible band 62 and the gate 58 encircle the inner housing 54 and close the elongate opening 56. Motion of the flexible band 62 allows the gate 58 to move back and forth along the Y-axis within the elongate opening 56.

The flexible band 62 has a lower edge 65 and an upper edge 67. A lower track 66 defines a lower groove or slot for supporting and guiding the lower edge 65 of the flexible band 62 and the gate 58. An upper inner track 68 and an upper outer track 70 cooperate to define an upper groove or slot for supporting and guiding the upper edge 67 flexible band 62 and the gate 58. An upper track 74 (FIG. 7) can be defined by the combination of the upper inner track 68 and the upper outer track 70. An outer housing 72 fits over the inner housing 54 and part of the flexible band 62. Outer housing 72 defines an outer elongate opening 76 that generally overlays the inner elongate opening 56 of the inner housing 54.

Other parts shown include a carriage side panel 78 and a carriage front cover 80 that form part of the lower housing assembly 40. More views and explanations of the completed assemblies will be discussed infra.

Figure 6A:
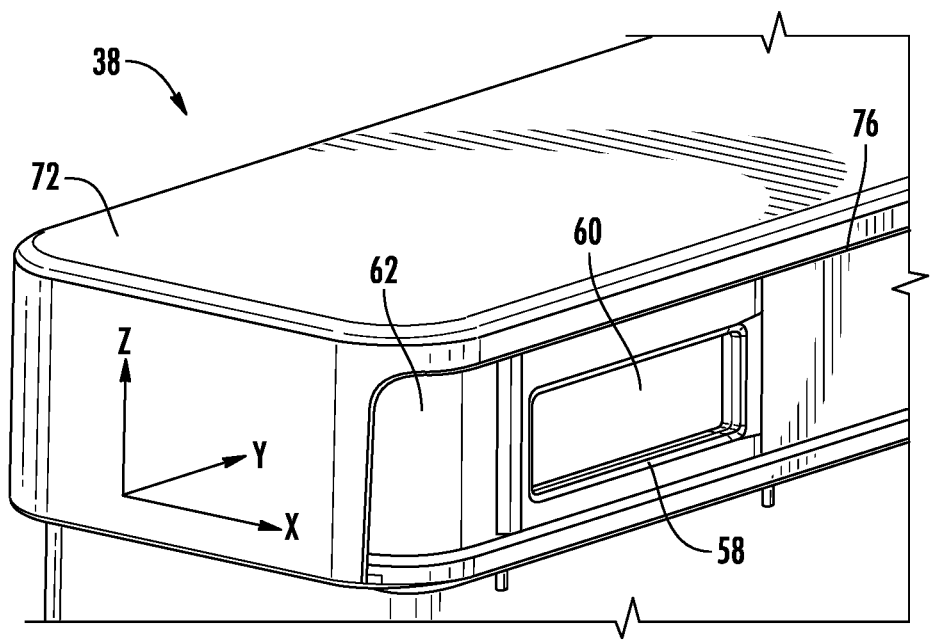
FIG. 6A is an isometric drawing of an embodiment of an outer portion of an upper housing assembly.

FIG. 6A is an isometric drawing of an outer view of a portion of the upper housing assembly 38. The gate 58 and flexible band 62 can be seen within the outer elongate opening 76 of the outer housing 72.

Figure 6B:
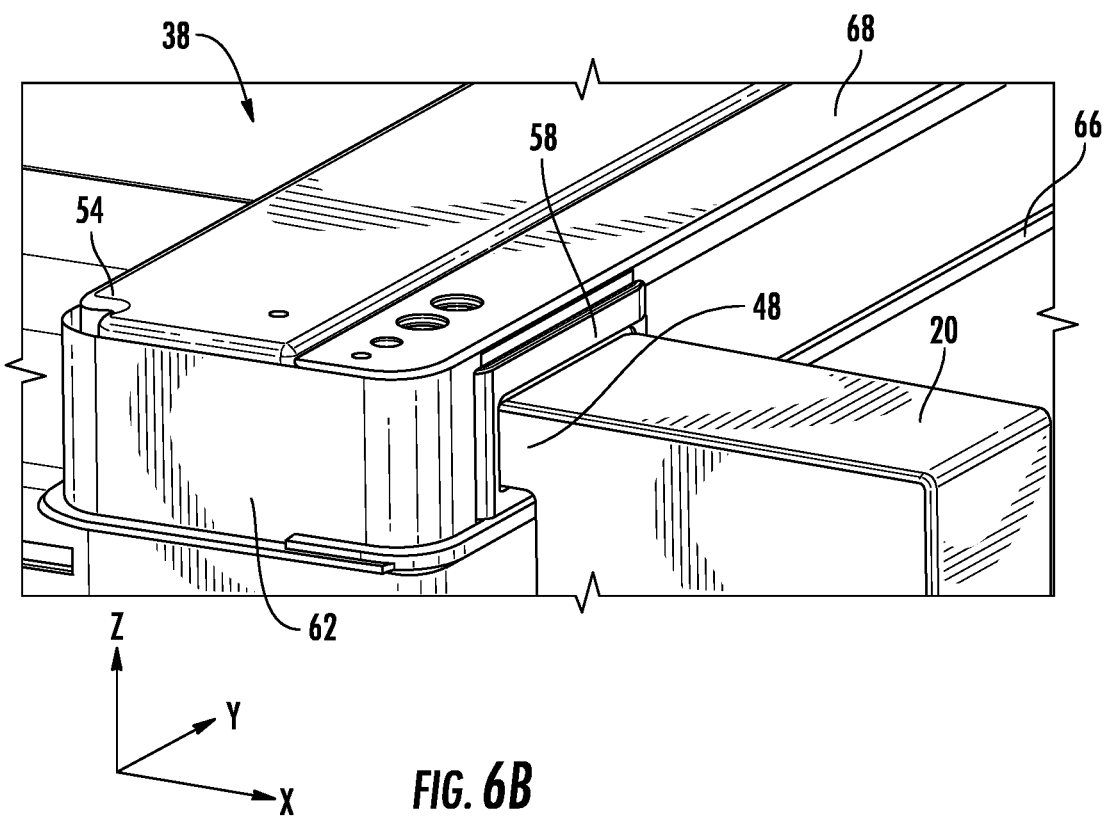
FIG. 6B is an isometric view of a portion of an embodiment of an upper housing assembly without an outer housing and including an attached printhead.

FIG. 6B is similar to FIG. 6A except that the printhead 20 is assembled to the carriage 30 and the outer housing 72 is removed. The upper lateral extension 48 of the printhead 20 extends along the −X direction and into the window 60. The upper lateral extension 48 generally fills the window 60 so that there is no open perimeter around the upper lateral extension 48. The flexible band 62 and gate 58 form a perimeter around the inner housing 54. The gate 58, along with printhead 20, can scan back and forth along the Y-axis during a printing operation. As the gate 58 scans, the belt 62 slides around a perimeter of the inner housing 54.

Figure 7:
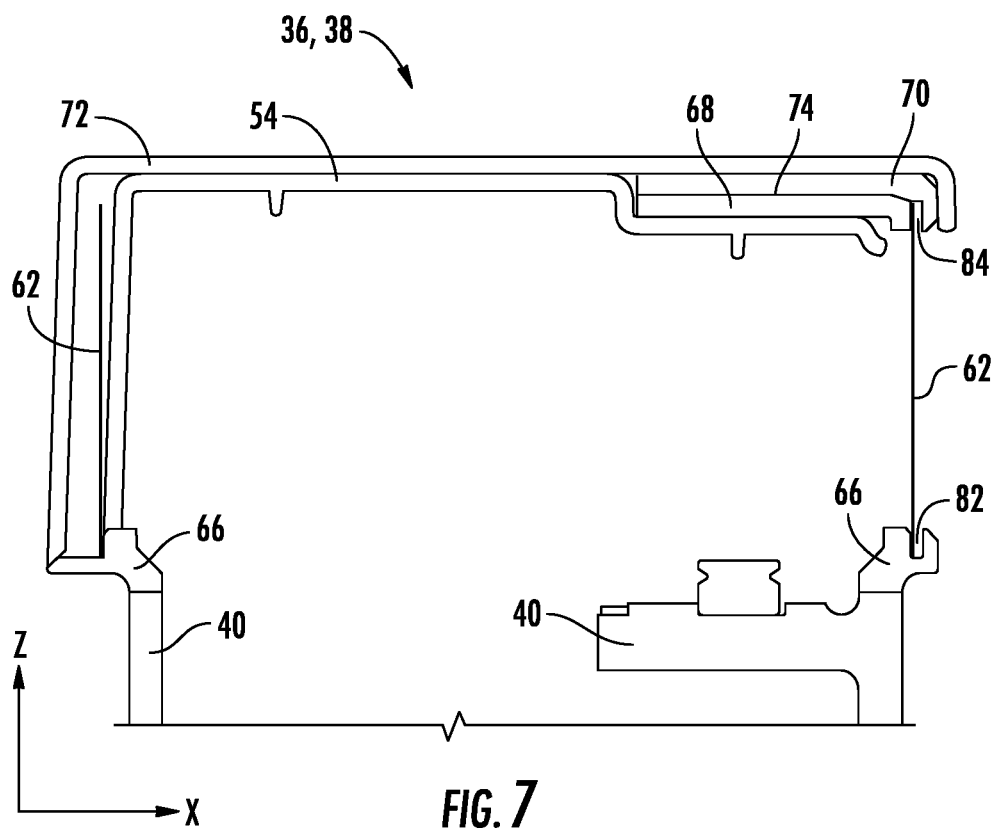
FIG. 7 is a cross-sectional view along an XZ-plane that passes through an embodiment of a housing assembly.

FIG. 7 is a cross-sectional view along an XZ-plane that passes through housing assembly 36 with emphasis on certain elements of the upper housing assembly 38. As seen in cross section, the lower track 66 defines an upward facing slot 82. The upper track 74 with a downward facing slot 84 is defined by cooperation between the upper inner track 68 and the upper outer track 70. Slots 84 and 82 are "opposing" since they are in facing relation with each other and are shown supporting and guiding opposing upper 67 and lower 65 (FIG. 5) edges of the flexible band 62 respectively. In cross section, the flexible band 62 is shown passing around on opposing sides of the inner housing 54 with respect to the X-axis. The outer housing 72 is shown assembled over the flexible band 62 and the inner housing 54.

Figure 8:
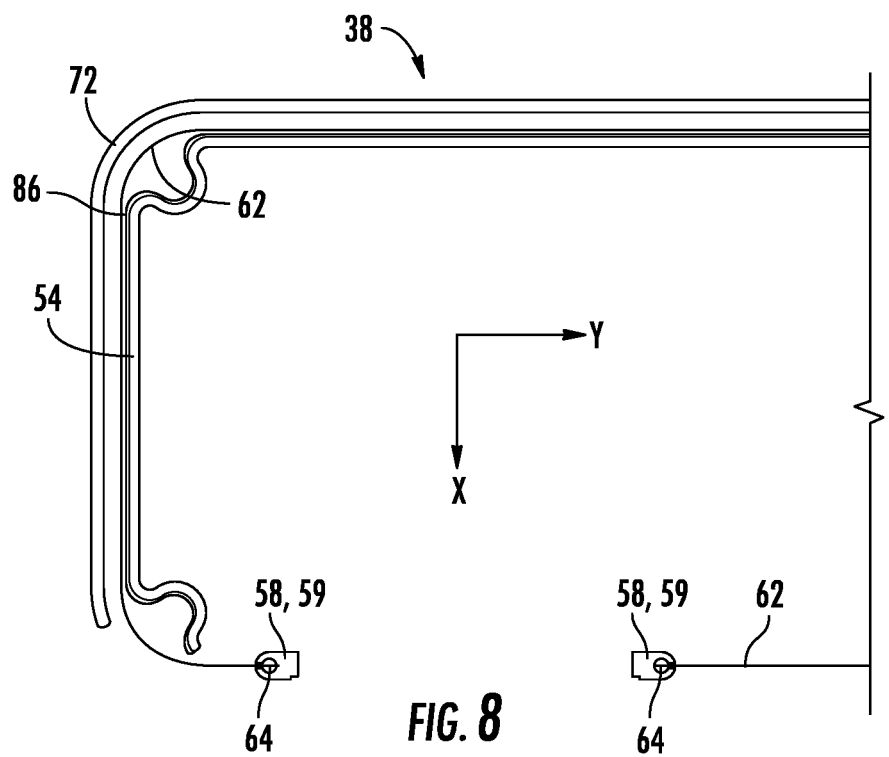
FIG. 8 is a cross-sectional view taken through an XY-plane that passes through an embodiment of a housing assembly.

FIG. 8 is a cross-sectional view taken through an XY-plane that passes though upper housing assembly 38. The flexible band 62 passes around the outer lateral perimeter 86 of the inner housing 54 on at least three vertical sides of outer housing 54. As shown, the outer housing 72 protects the flexible band 62 on at least three vertical sides. The attachment ends 64 of the flexible band 62 are shown coupled to the vertical ends 59 of the gate 58.

Figure 9:
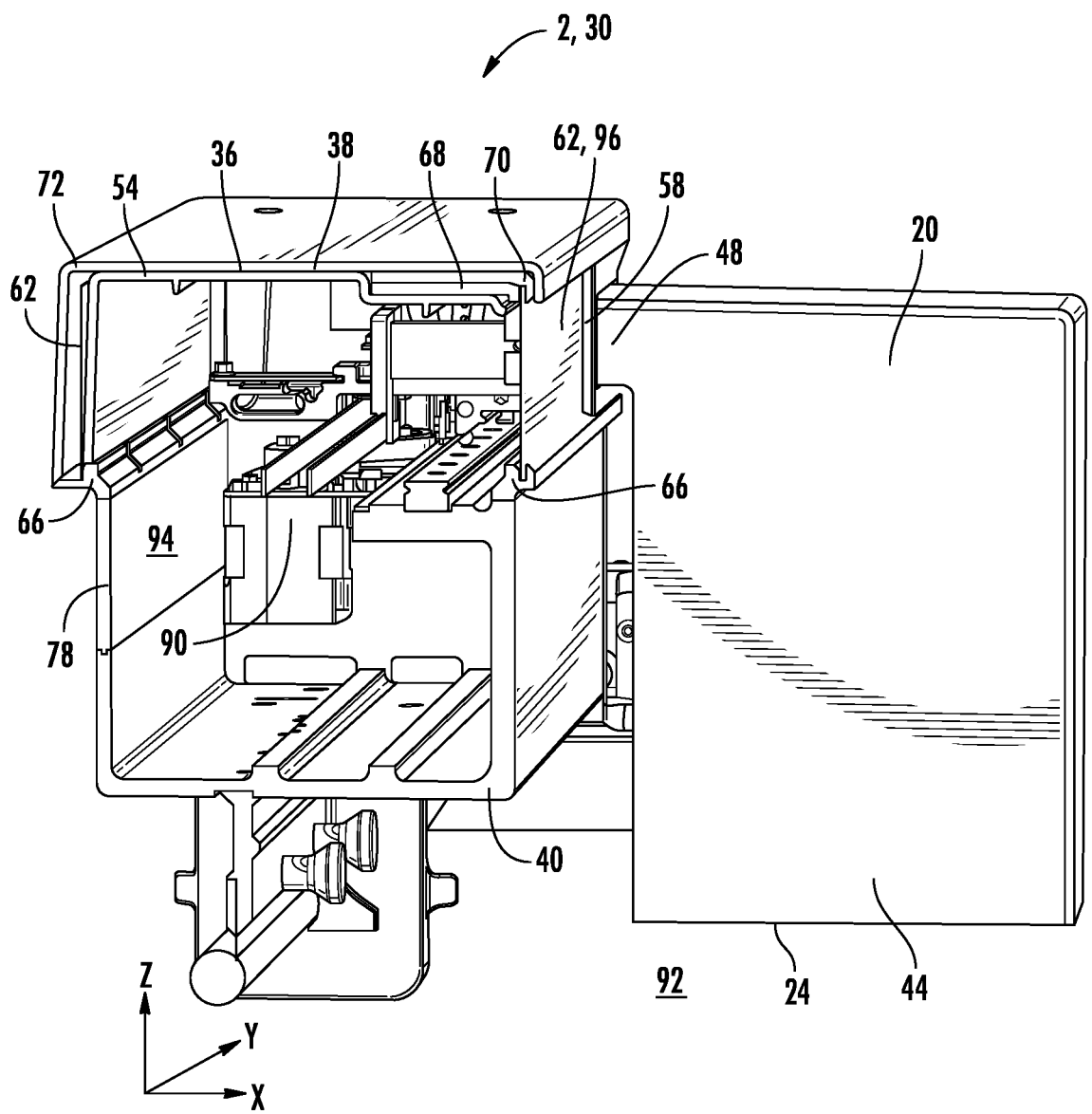
FIG. 9 is a cutaway view of a portion of an embodiment of a system including a carriage with carriage internal components that are mechanically, fluidically, and electrically coupled to printhead internal components. The carriage includes a housing assembly and the printhead includes a printhead housing. The housing assembly and printhead housing cooperate to protect their respective coupled internal components.

FIG. 9 is a cutaway view of a portion of system 2 including the housing assembly 36 that encases and protects internal components 90 of the carriage 30. The internal components provide mechanical, fluidic, and electronic support of the printhead 20. The housing assembly 36 includes lower housing assembly 40 and upper housing assembly 38. Lower housing assembly 40 includes carriage side panel 78. Elements of the upper housing assembly 38 have been discussed already.

The fluid ejected by printhead 20 can be very corrosive and/or be subject to bacterial growth. The cooperation of printhead housing 44 and housing assembly 36 provide a protection of the internal components 90 and 52 (FIG. 4) from damage and contamination. Also, the cooperation of printhead housing 44 and housing assembly 36 enable cleaning of the print zone 43 which contains surface 12 (FIG. 1).

When the printhead 20 is coupled to the carriage 30, the internal components 52 of the printhead 20 are coupled to the internal components 90 of the carriage 30. The coupling between internal components 52 of the printhead and internal components 90 of the carriage 30 include mechanical, fluidic, and electrical connections. The mechanical connections provide mechanical support of the printhead 20 for scanning along the Y-axis. The fluidic connections supply printing fluid to the printhead 20 and couple the fluid supply 18 to the printhead 20. The electrical connections allow controller 28 to drive the array of drop generators 50.

Housing assembly 36 defines an internal chamber 94 containing the internal components 90. Housing assembly 36, as the cooperation between upper housing assembly 38 and the lower housing assembly 40, separate the print zone 43 from the internal chamber 94. The printhead 20 is attached to the housing assembly 36 along an upper vertical wall 96 of the upper housing assembly 38. The housing assembly 36 is configured to allow the printhead 20 to scan along the Y-axis while maintaining a separation between the print zone 43 and the internal chamber 94.

The housing assembly 36, in cooperation with the printhead assembly 44, separate the internal chamber 94 from a region or space 92 above the print zone 43. During operation, the space 92 and print zone 43 can be contaminated with powder and binder materials.

The disclosed system 2 can be used for a wide range of applications. One example of an application is the formation of a medical material or device requiring sterile surfaces and bulk materials. Another example is for food printing. For both medical materials and food printing, there is a desire to be able to clean the print zone 43 and to prevent component contamination. Yet another example application is the fabrication of non-food articles 4 using adhesive binding agents.

The specific embodiments and applications thereof described above are for illustrative purposes only and do not preclude modifications and variations encompassed by the scope of the following claims.

What is claimed:

1. A three-dimensional printing system comprising:
    a build plate including a lateral print area having a length along an X-axis and a width along a Y-axis;
    a carriage having a major axis along the Y-axis that spans the width of the lateral print area;
    a housing assembly covering the carriage; and
    a printhead coupled to the carriage and having a printhead housing, wherein:
        the housing assembly and the printhead housing separate a print zone containing the lateral print area from connected internal components of the printhead and connected internal components of the carriage;
        the carriage is configured to scan along the X-axis;
        the printhead is configured to scan along the Y-axis;
        the printhead is configured to address the lateral print area;
        the housing assembly comprises a window configured to receive the printhead; and
        the window comprises a gate configured to scan along the housing assembly.

2. The three-dimensional printing system of claim 1 wherein:
    the printhead comprises:
        a main body with a lower ejection face; and
        a lateral extension;
    the lower ejection face faces the lateral print area; and
    the lateral extension extends along the X-axis from the main body to the carriage.

3. The three-dimensional printing system of claim 2 wherein the lateral extension is an upper lateral extension that extends laterally from a top portion of the printhead.

4. The three-dimensional printing system of claim 2 wherein:
    the window is located on a vertical portion of the housing assembly; and
    the lateral extension of the printhead extends into the window.

5. The three-dimensional printing system of claim 4 wherein
    the gate scans along the vertical portion of the housing assembly.

6. The three-dimensional printing system of claim 5 further comprising:
    a flexible band having two ends that are individually attached to ends of the gate, wherein reciprocal motion of the flexible band provides scanning of the gate and the printhead across the width of the lateral print area.

7. The three-dimensional printing system of claim 6 further comprising:
    a lower housing assembly; and
    a lower track supported by the lower housing assembly, wherein the lower track supports and guides a lower edge of the flexible band.

8. The three-dimensional printing system of claim 6 further comprising:
    an inner housing, wherein
        the inner housing defines an elongate opening along the Y-axis that is closed by the flexible band in cooperation with the gate; and
        the flexible band slides along three sides of the inner housing.

9. The three-dimensional printing system of claim 8 further comprising an outer housing that:
    fits over the inner housing; and
    protects the flexible band.

10. The three-dimensional printing system of claim 8 further comprising an upper track supported by the inner housing, wherein the upper track is configured to guide an upper edge of the flexible band.

11. The three-dimensional printing system of claim 10 wherein the upper track comprises a cooperative assembly of an upper inner track and an upper outer track.

12. A method of providing a three-dimensional printing system, the method comprising:
    providing a build plate including a lateral print area having a length along an X-axis and a width along a Y-axis;
    providing a carriage having a major axis along the Y-axis that spans the width of the lateral print area;
    providing a housing assembly covering the carriage; and
    providing a printhead coupled to the carriage and having a printhead housing, wherein:
        the housing assembly and the printhead housing separate a print zone containing the lateral print area from connected internal components of the printhead and connected internal components of the carriage;
        the carriage is configured to scan along the X-axis;
        the printhead is configured to scan along the Y-axis;
        the printhead is configured to address the lateral print area;
        the housing assembly comprises a window configured to receive the printhead; and
        the window comprises a gate configured to scan along the housing assembly.

13. The method of claim 12 wherein
    the printhead comprises:
        a main body with a lower ejection face; and
        a lateral extension;
    the lower ejection face faces the lateral print area; and
    the lateral extension extends along the X-axis from the main body to the carriage.

14. The method of claim 13 wherein the lateral extension is an upper lateral extension that extends laterally from a top portion of the printhead.

15. The method of claim 13 wherein:
    the window is located on a vertical portion of the housing assembly; and
    the lateral extension of the printhead extends into the window.

16. The method of claim 15 wherein the gate scans along the vertical portion of the housing assembly.

17. The method of claim 16 further comprising:
providing a flexible band having two ends that are individually attached to ends of the gate, wherein reciprocal motion of the flexible band provides scanning of the gate and the printhead across the width of the lateral print area.

18. The method of claim 17 further comprising:
providing a lower housing assembly; and
providing a lower track supported by the lower housing assembly, wherein the lower track supports and guides a lower edge of the flexible band.

19. The method of claim 17 further comprising:
providing an inner housing, wherein
   the inner housing defines an elongate opening along the Y-axis that is closed by the flexible band in cooperation with the gate; and
   the flexible band slides along three sides of the inner housing.

20. The method of claim 19 further comprising:
providing an outer housing that:
   fits over the inner housing; and
   protects the flexible band.

\* \* \* \* \*